(12) United States Patent
Chopra et al.

(10) Patent No.: US 9,432,273 B2
(45) Date of Patent: Aug. 30, 2016

(54) SYSTEM AND METHOD FOR MONITORING BITTORRENT CONTENT AND THE COMPUTERS THAT SHARE BITTORRENT CONTENT

(71) Applicant: Tiversa IP, Inc., Pittsburgh, PA (US)

(72) Inventors: Anju Chopra, Gibsonia, PA (US); Robert J. Boback, Moon Township, PA (US)

(73) Assignee: TIVERSA IP, INC., Pittsburgh, PA (US)

( * ) Notice: Subject to any disclaimer, the term of this patent is extended or adjusted under 35 U.S.C. 154(b) by 398 days.

(21) Appl. No.: 13/911,563

(22) Filed: Jun. 6, 2013

(65) Prior Publication Data

US 2014/0025728 A1   Jan. 23, 2014

Related U.S. Application Data

(60) Provisional application No. 61/656,675, filed on Jun. 7, 2012, provisional application No. 61/726,346, filed on Nov. 14, 2012.

(51) Int. Cl.
| | |
|---|---|
| *G06F 15/16* | (2006.01) |
| *H04L 12/26* | (2006.01) |
| *H04L 29/06* | (2006.01) |

(Continued)

(52) U.S. Cl.
CPC ......... *H04L 43/08* (2013.01); *G06F 17/30209* (2013.01); *H04L 63/00* (2013.01); *H04L 67/1061* (2013.01); *H04L 67/108* (2013.01)

(58) Field of Classification Search
CPC .............. G06F 17/30209; G06F 17/30067; H04L 43/14; H04L 43/08; H04L 63/00; H04L 67/1061; H04L 67/108

USPC ................ 709/213, 214, 216, 223, 224, 226
See application file for complete search history.

(56) References Cited

U.S. PATENT DOCUMENTS

| | | | |
|---|---|---|---|
| 7,814,146 B2 | 10/2010 | Chavez et al. | |
| 8,015,283 B2* | 9/2011 | Seidel | H04L 43/12 709/224 |
| 8,204,915 B2* | 6/2012 | Dolganow | G06F 17/30209 707/803 |

(Continued)

OTHER PUBLICATIONS

The International Search Report and Written Opinion mail date Aug. 14, 2013 for PCT/US2013/044429, International Filing Date of Jun. 6, 2013 for Tiversa IP, Inc. entitled A System and Method for Monitoring Bittorrent, 13 pages.

(Continued)

*Primary Examiner* — Viet Vu
(74) *Attorney, Agent, or Firm* — Cesari and McKenna, LLP

(57) ABSTRACT

In one embodiment, one or more BitTorrent management pages, such as an index site or a Rich Site Summary (RSS) feed, may be scanned for indicia of a torrent file that is associated with one or more search terms. After the torrent file is located, information associated with the torrent file may be utilized to initiate the downloading of one or more portions of the content indicated by the torrent file over a network from swarm computers utilizing a BitTorrent Protocol. As the content is being downloaded from the swarm computers, identification information associated with each swarm computer may be obtained. Data associated with the torrent file and the identification information may be stored at a database. Thereafter, a client may search the database to locate one or more swarm computers that may be sharing, for example, unauthorized or illegal information.

19 Claims, 6 Drawing Sheets

(51) Int. Cl.
*H04L 29/08* (2006.01)
*G06F 17/30* (2006.01)

(56) References Cited

U.S. PATENT DOCUMENTS

| | | |
|---|---|---|
| 2005/0203851 A1 | 9/2005 | King et al. |
| 2008/0005195 A1* | 1/2008 | Li ................... G06F 17/30209 |
| 2008/0133706 A1 | 6/2008 | Chavez et al. |
| 2009/0276522 A1 | 11/2009 | Seidel et al. |
| 2011/0158238 A1* | 6/2011 | Chen ................ H04L 29/12301 370/392 |
| 2012/0209911 A1* | 8/2012 | Siganos ............. H04L 43/0852 709/204 |
| 2013/0226865 A1 | 8/2013 | Munemann et al. |

OTHER PUBLICATIONS

Chow K P Et al., "BTM—An Automated Rule-based BT Monitoring System for Piracy Detection," Internet Monitoring and Protection, 2007, ICIMP 2007, Second International Conference on, IEEE PI, Jul. 1, 2007, 6 pages.

Rodrigo B Mansilha et al, "Observing the BitTorrent universe through Telescopes", Integrated Network Management (IM), 2011, IFIP/IEEE International Symposium ON, IEEE, May 23, 2011, pp. 321-328.

Michal Kryczka et al., "Measuring the bittorrent ecosystem: Techniques, tips, and tricks," IEEE Communications Magazine, IEEE Service Center, Piscataway, US, vol. 49, No. 9, Sep. 1, 2011, pp. 144-152.

* cited by examiner

SYSTEM AND METHOD FOR MONITORING BITTORRENT CONTENT AND THE COMPUTERS THAT SHARE BITTORRENT CONTENT

CROSS-REFERENCE TO RELATED APPLICATIONS

The present application claims the benefit of U.S. Provisional Patent Application Ser. No. 61/656,675 filed on Jun. 7, 2012, by Anju Chopra et al. for a BIT TORRENT SCAN WITH CROSS COMPARISON FOR ROBUST DATA MONITORING and U.S. Provisional Patent Application Ser. No. 61/726,346 filed on Nov. 14, 2012, by Anju Chopra et al. for a BIT TORRENT SCAN WITH CROSS COMPARISON FOR ROBUST DATA MONITORING, each of which are hereby incorporated by reference.

BACKGROUND

1. Technical Field

The present disclosure relates generally to computer networks and more particularly to monitoring a BitTorrent network.

2. Background Information

The BitTorrent protocol is concerned with the reliable transfer of files. Users may search for torrent files, which are then used to download content of interest from "swarm" computers over a network, using a variety of methods. For example, a user may find particular torrent files by searching indexing sites/tracker sites by searching peer-to-peer (P2P) networks, by joining Rich Site Summary (RSS) feeds, or by utilizing other types of BitTorrent management pages. Each BitTorrent management page can have its own syntax and format. Accordingly, there is no single or consistent way to probe for context across the variety of different BitTorrent management we pages. Further, there is no centralized BitTorrent network where all participants can potentially be reached through connection hopping. Instead, each torrent "swarm" is an enclosed community, each Tracker site has no protocol level connection to the next, and indexing sites are disjoint from the one another.

SUMMARY

Thus there remains a need to efficiently monitor content associated with torrent files and the swarm computer sharing the content.

According to one or more embodiments, one or more BitTorrent management pages, such as an index site or a Rich Site Summary (RSS) feed, may be scanned for indicia of a torrent file that is associated with one or more search terms. After the torrent file is located, information associated with the torrent file may be utilized to initiate the downloading of one or more portions of the content indicated by the torrent file over a network from swarm computers utilizing a BitTorrent Protocol. As the content is being downloaded from the swarm computers, identification information associated with each swarm computer may be obtained.

Data associated with the torrent file, content associated with the torrent file, and the identification information associated with each of the swarm computers may be stored in a database. Thereafter, a client may search the database, or a different storage structure, that stores the data associated with the torrent files, the content, and the identification information to locate one or more swarm computers that may be sharing, for example, unauthorized or illegal information.

Further, the results obtained from the novel torrent monitoring system may be cross-compared with other systems (e.g., peer-to-peer network scans) using the same search terms to classify or categorize the combined results according to a "threat" level.

Advantageously, torrent files, their content, and the swarm computers that share content associated with the torrent files may be efficiently monitored.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
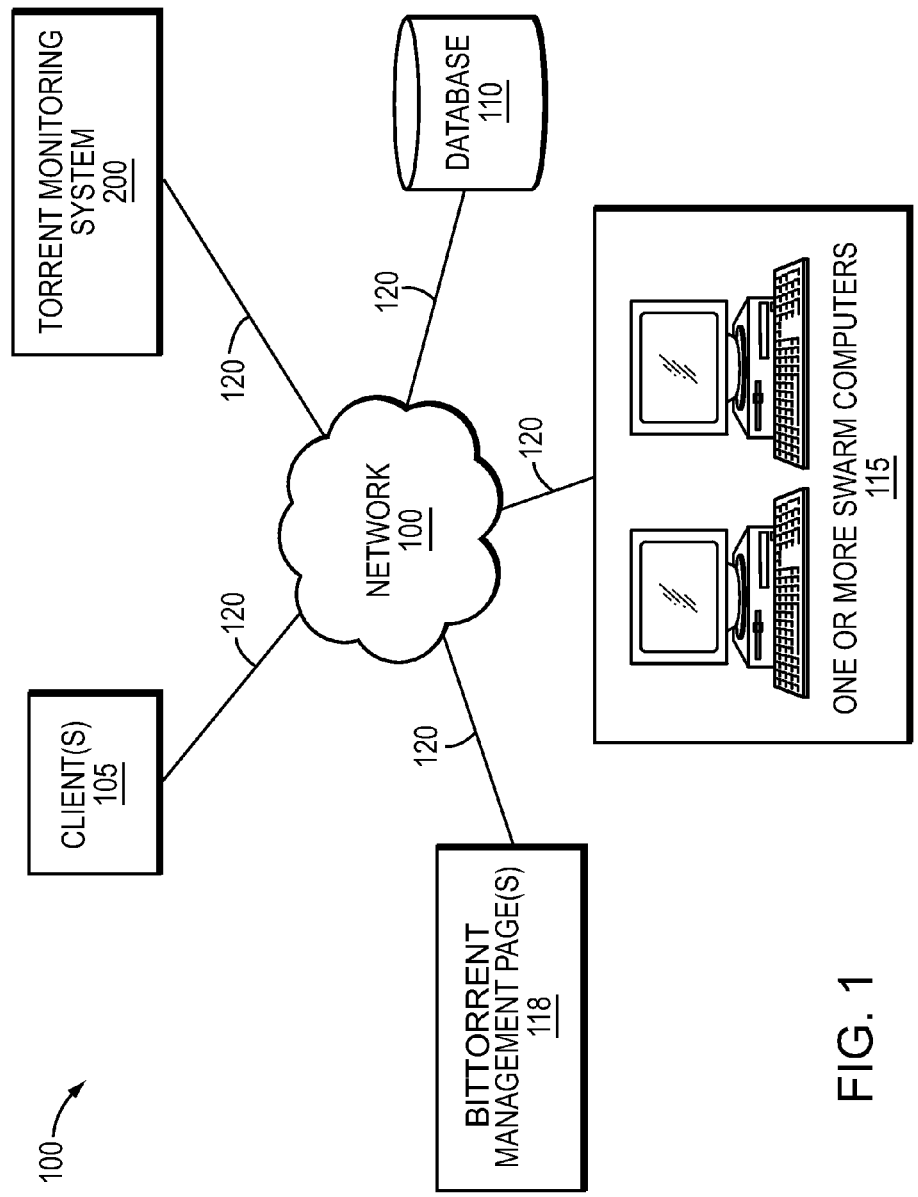
FIG. 1 illustrates an example computer network.

FIG. 1 illustrates an example computer network 100 illustratively comprising client computers 105, torrent monitoring system 200, database 110, one or more swarm computers 115, and BitTorrent management pages 118 interconnected by communication links 120. Those skilled in the art will understand that any number of client computers, torrent monitoring system, database, swarm computers and/or links may be used in the computer network, and that the view shown herein is for simplicity.

Client computer 105 and swarm computers 115 may be any general purpose data processor, such as a personal computer or a workstation. Database 110 is a conventional structure that organizes a collection of data as known by those skilled in the art.

Figure 2:
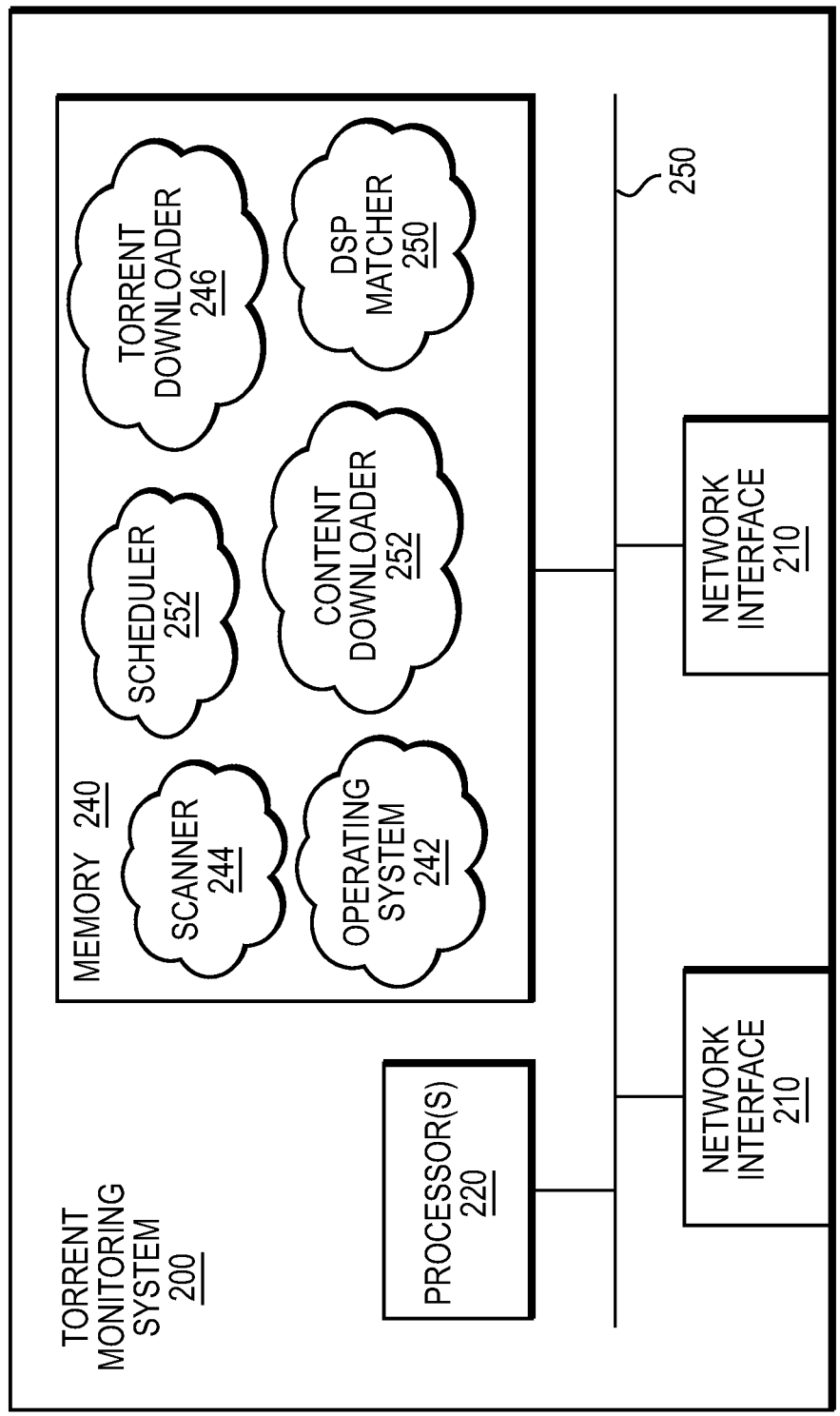
FIG. 2 illustrates an example torrent monitoring system that may be utilized in the computer network of FIG. 1.

FIG. 2 illustrates an example torrent monitoring system 200 that may be used with one or more embodiments described herein. The torrent monitoring system 200 may comprise a plurality of network interfaces 210, one or more data processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of locations that are addressable by the processor(s) 220 and the network interfaces 210 for storing software programs and data structures associated with the embodiments described herein. The processor 220 may comprise necessary elements or logic adapted to execute the software programs and manipulate the data structures. An operating system 242 portions of which are typically resident in memory 240 and executed by the processor(s), functionally organizes the node by, inter alia, invoking network operations in support of software processes and/or services executing on the node. These software processes and/or services may comprise scheduler, 238, scanner 244, torrent downloader 246, DSP matcher 250, and content downloader 252.

Scheduler 238 is a process responsible for recurring execution of scanner 244, that is described below. Since indexing sites are a centralized repository and constant repeated probing can lead to the scheduler 238 being banned from accessing the indexing site, batch processing for torrent file discovery from a BitTorrent management page is advantageous. As such, scheduler 238 may minimize the footprint on the BitTorrent management page by batching the access to the BitTorrent management page, interleaving access across BitTorrent management pages to maximize time between access per site, and per site throttling. Each schedule defined by scheduler 238 may be with configuration items such as a recurrence value (e.g., every X hours, start/stop date), type of scan (RSS, search, walk, import, etc.) and a scan type input source value (e.g., for RSS: list of RSS feeds, for search: list of indexing sites, for walk: list of indexing sites, and for import: import protocol source). Scheduler 238 may be managed by an end user, for example an administrator using client 105.

Scanner(s) 244 is a process responsible for discovering torrent files from a variety of BitTorrent "management page" types. These management pages provide indicia as to how to find torrent files, and may include indexing web sites, tracker sites, RSS feeds, etc. Each scanner 244 is configured to scan the BitTorrent management page according to the BitTorrent management page's syntax and/or format. For example, an indexing site may have a different syntax and/or format from an RSS feed, or may even have a different format than another indexing site. As such, scanners 244 are configured to interact with a variety of different BitTorrent management pages having different syntax and/or format.

Each scanner 244 may receive a set of search terms of interest (referred to here as the digital signature profile (DSP) search terms) from a user, utilizing client 105 for example. The DSP search terms are then used to scan the associated type of BitTorrent management pages for associated torrents, in a manner described in more detail below.

Scanners 244 may include an "Index Scanner" (IS) that is designed to scan BitTorrent management pages that are of the indexing site type. Specifically, the IS 244 may search indexing sites for torrents using the specific DSP search terms. The search-ability of the IS 244 is constrained by the indexing algorithm implemented and exposed by the indexing site. For example, more sophisticated indexing sites allow qualified search by popularity, by timeliness, by genre, etc, while less sophisticated indexing sites may only sort result by upload time, and lookup index of torrent file name. Other available indexing criteria may include torrent file name, content file name, descriptions and metadata. The IS 244 can form site specific URLs that contain the configured DSP terms. Each term, for example, may require one search request per indexing site.

Scanners 244 may also include a "RSS Scanner" (RSSS) that is specifically purposed to discover available torrents published by RSS feeds. An RSSS contacts the RSS syndication site(s) to download RSS feeds. Depending on the RSS site format, torrent URLs may be specified on the RSS XML itself, or indirectly on linked HTTP page(s).

Scanners 244 may also include a "Walk Scanner" (WK) that is configured to scan for new torrents that were added to indexing sites since a previous walk. On each scan, the WK starts after the last torrent from a previous scan, then sequentially walk up to a last available torrent. Utilizing the WK has the advantage of not rediscovering a torrent more than once across walks, being exempt from result limits arbitrarily imposed by indexing sites, and sensitive search terms are never transmitted. The WK utilizes the sequential number of uploaded torrents and availability of "latest torrent" page provided by the indexing site.

Scanners 244 may also include an "Import Scanner" (ImS) that scans for torrent files made available via Peer-to-Peer (P2P) protocol engines. The ImS assumes that the P2P protocol engines deliver files to a pre-determine import folder. An ImS periodically scans the import folder for new torrent file. IS can be configured to either truncate, or delete torrents at the data store maintained by the P2P protocol engines.

Each type of scanner 244 ((IS, RSSS, WK, ImS) thus scans is associated type of BitTorrent management page(s) and produces one or more torrent file indicators as an output. A torrent downloader 246 then uses this output and invokes a site specific JavaScript to extract the torrent download URL, or magnet links from the BitTorrent management page(s). If a torrent is unable be downloaded, or fails, a schedule may be created by specifying a recurrence interval to attempt to re-download the torrent.

It is noted that in one embodiment, the torrent files are hosted by the BitTorrent management page(s), however, in other embodiments, the BitTorrent management pages(s) may store a key or "fingerprint" associated with a torrent file. Thereafter, the key or fingerprint may be utilized to obtain the torrent file from a decentralized network, for example a Distributed Hash Table (DHT) network.

Successfully downloaded torrents are recorded in database 110 and unsuccessfully downloaded torrents may be stored in a table of the database 110, or other data structure for re-download. Torrents are identified relative to the Uniform Resource Identifier (URI) associated with the BitTorrent management page on which they were discovered. Thus, if a torrent file is found in two different indexing sites, they are treated as two separate torrent entries in the database. Uniqueness may be enforced in the database using the URI as a primary key.

The torrent files themselves are also subject to indexing. Because torrent files are in binary "Bencode" format, they are not submitted directly to an indexer. Rather, a text file may be generated in which ancillary data collected during discovery of the torrent are included. The ancillary data yields additional information that is useful in forensic investigation and may include: index site detail page URL, index site torrent download URL, index site detail page description of the torrent, user who posted the torrent to the index site, RSS description for the torrent, etc.

Successfully downloaded torrents stored in database 110 may be subsequently subject to a DSP matching/filtering process performed by DSP matcher 250. Successfully matched torrents are persisted in database 110, and may be moved to permanent storage. Non matching torrent files may be discarded.

Successfully matched torrents may then be utilized by content downloader 252 to download content associated with the successfully matched torrents. Content downloader 252 continually scans for outstanding swarm jobs to execute that are queued after DSP matcher 250 performs its filtering. Content downloader 252 cycles through outstanding swarm jobs and attempts to connect to each swarm to download the associated content.

Content downloader 252 utilizes the corresponding BitTorrent swarming protocol to discover swarm computers who are sharing (seeding) or downloading (leeching) from the swarm. Specifically, content downloader 252 may utilize different trackers to identify the swarm computers that are either sharing or interested in downloading the content depending on the protocol specified by the torrent. Such trackers may include a Hypertext Transfer Protocol (HTTP) tracker, User Datagram Protocol (UDP) tracker, DHT tracker, Peer Exchange (PEX) Tracker and the like. Once the swarm computers are identified, content downloader 252 can then download the one or more portions of content associated with the torrent from the swarm computers. Further, while the one or more portions of content are being downloaded from the swarm computers, content downloader 252 may obtain identification information associated with the individual swarm computers that participate in the torrent. For example, once the swarm computer is identified, the torrent monitoring system 200 may establish a TCP connection with the swarm computer and start downloading the one or more portions of content according to the BitTorrent protocol. During establishment of the TCP connection, the torrent monitoring system 200 may learn the IP address, and other identification information s associated with the swarm computer(s). The identification information, as well as the content, may then be stored at database 110. Further, content downloader 252 may reschedule those torrents without an active swarm.

It is therefore possible for popular torrents to become part of several schedules or scan types. If a torrent is rediscovered before the corresponding swarm job is completed, content downloader 252 updates the swarm job to perform the aggregate tasks defined by the affecting schedules. Once downloaded, content downloader 252 marks the torrent and discards the swarm job.

Figure 3:
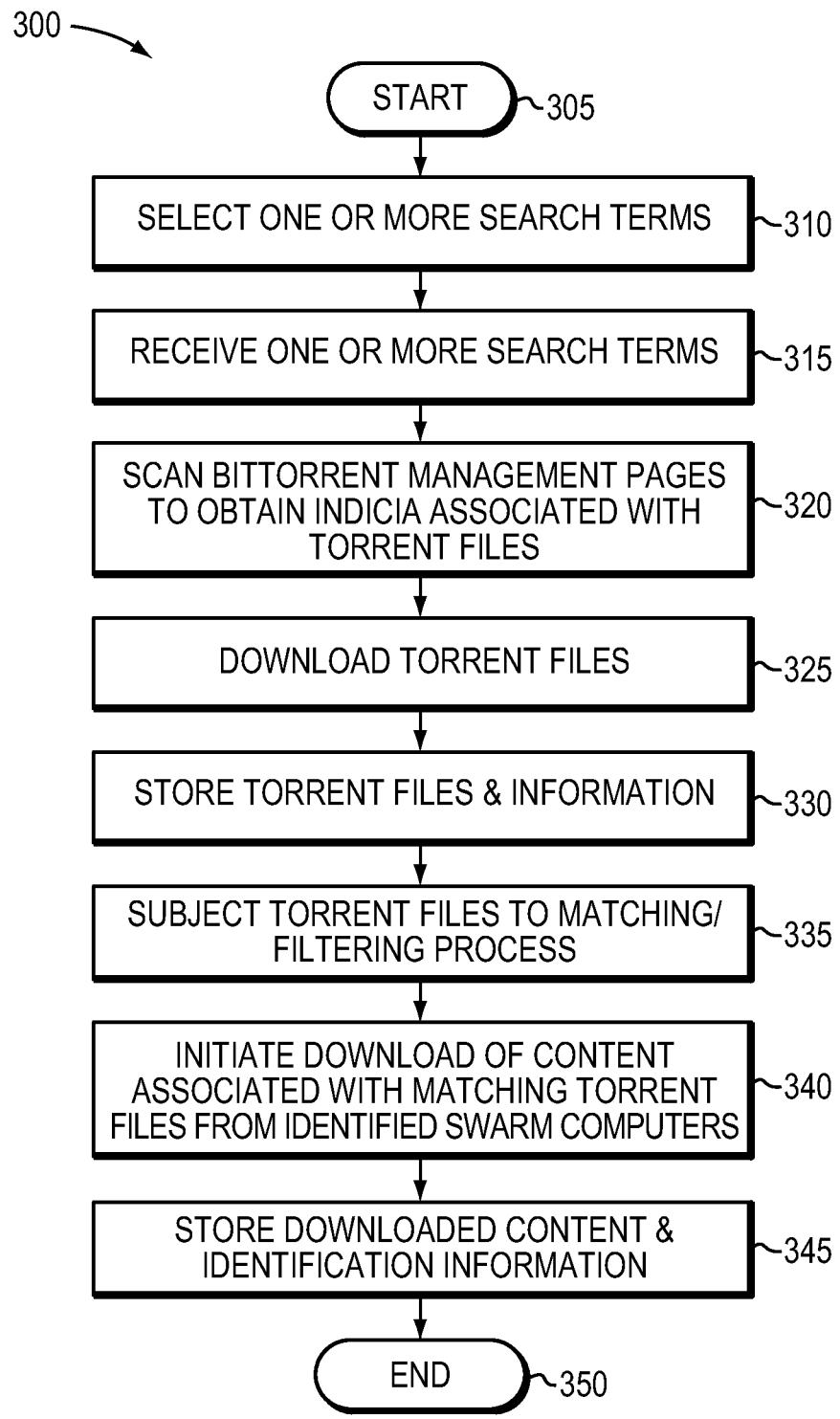
FIG. 3 illustrates an example simplified procedure for monitoring BitTorrent.

FIG. 3 illustrates an example simplified procedure for monitoring BitTorrent. The procedure 300 starts at step 305 and continues to step 310, where a client, for example client 105, selects one or more DSP search terms. In step 315 the DSP search terms are received over the network 100 at torrent monitoring system 200. In step 320, scanner 244 of torrent monitoring system 200 utilizes the received DSP search terms to scan one or more BitTorrent management pages 118 over network 100 to obtain indicia associated with the torrent files that those pages 118 manage. Since different BitTorrent management pages may have a different syntax and/or format, the scanning in step 320 invokes the appropriate type of scanner 244 (IS, RSSS, WK, ImS, etc.).

In step 325, torrent downloader 246 may extract or download one or more torrent files that are associated with the indicia discovered by scanner 244. For example, torrent downloader 246 may download the one or more torrent files from the BitTorrent management page(s) that host the torrent files. In a different embodiment, the torrent downloader 246 may utilize keys or fingerprints hosted by the BitTorrent management page(s) and associated with the torrent files to download the torrent files from decentralized networks (e.g., DHT and PEX). In step 330, the extracted torrent files and information associated with the torrent files may be stored in database 110. For example, a text file may be generated in which ancillary data collected during discover of the torrent may be stored in database 110. In step 335, DSP matcher 250 may subject the torrent files previously stored in database 110 to a matching/filtering process. Successfully matched torrents are persisted in database 110, and may be moved to permanent storage, while non-matching torrent files are discarded.

In step 340, the matching torrents are queued in a queue associated with content downloader 252, and content downloader 252 initiates download of content associated with a particular matching torrent from one or more identified swarm computers 115. In step 345, the downloaded content and identification information associated with the one or more identified swarm computers 115 may be stored in database 110. The procedure ends at step 350.

Figure 4:
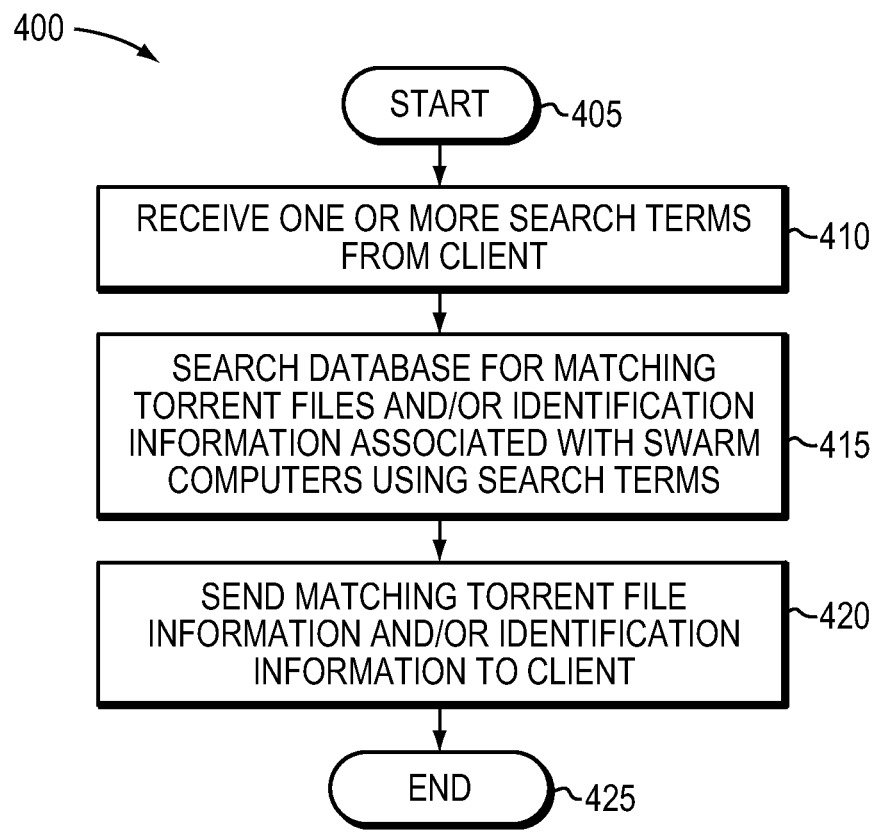
FIG. 4 illustrates an example simplified procedure for searching for information associated with the torrent monitoring system of the current application.

FIG. 4 illustrates an example simplified procedure for searching for information associated with the torrent monitoring system 200. The procedure 400 starts at step 405 and continues to step 410, where a client, for example client 105, selects one or more DSP search terms. In step 410, the DSP search terms are received by the torrent monitoring system 200. In step 415, the torrent monitoring system 200 utilizes the received DSP search terms to search the database for matching torrent information and/or identification information associated with one or more swarm computers 115. In step 420, the matching torrent information and/or identification information associated with the one or more swarm computers 115, may be sent to client 105. The procedure ends at step 425.

Figure 5:
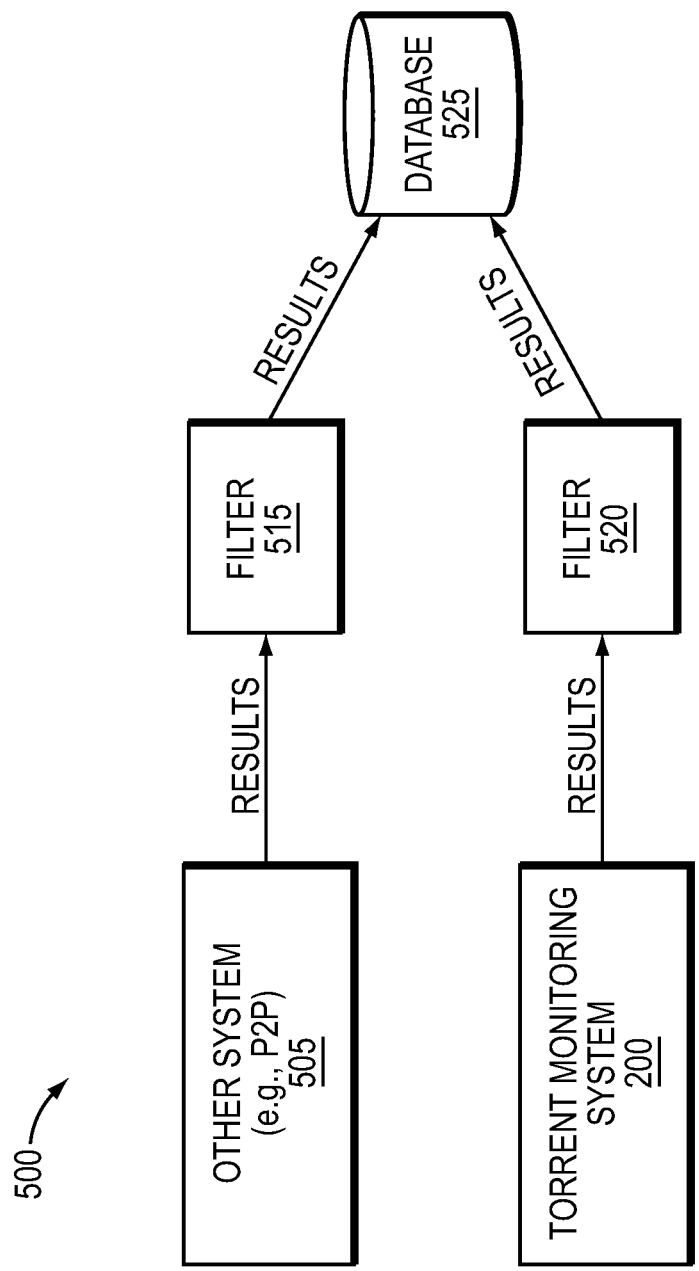
FIG. 5 illustrates an example system for cross-comparing information obtained from the torrent monitoring system with information obtained from other systems using the same search terms.

In a further embodiment, the search term-related information (e.g., torrent file information, identification information associated with swarm computers) uncovered by the novel torrent monitoring system 200 may be cross-compared against information obtained from other systems using the same search terms, such as Internet-based search engines or peer-to-peer network searching tools. FIG. 5 is an example system 500 for cross-comparing information obtained from the torrent monitoring system 200 with information obtained from other systems 505 using the same search terms. One example of another search system is described in co-pending U.S. patent application Ser. No. 13/706,703 filed on Dec. 6, 2012 entitled SYSTEM FOR FORENSIC ANALYSIS OF SEARCH TERMS". As such, each system can be configured to scan its respective information source (e.g., database 110) and provides results to filters 515 and 520 that may perform filtering operations based on file titles, file copies, etc. Other information such as IP addresses can provide further sort and/or matching, for example those found in database 110 associated with the one or more swarm computers.

The results from both systems may be stored in a centralized data storage system such as database 525 where intent and threats can be categorized (e.g., to determine if the scan pattern is indicative of information concentrators, hacker threats, physical/terror threats, or corporate security threats) by the capabilities of either the torrent monitoring system 200 or the traditional P2P network scan system 505.

Figure 6:
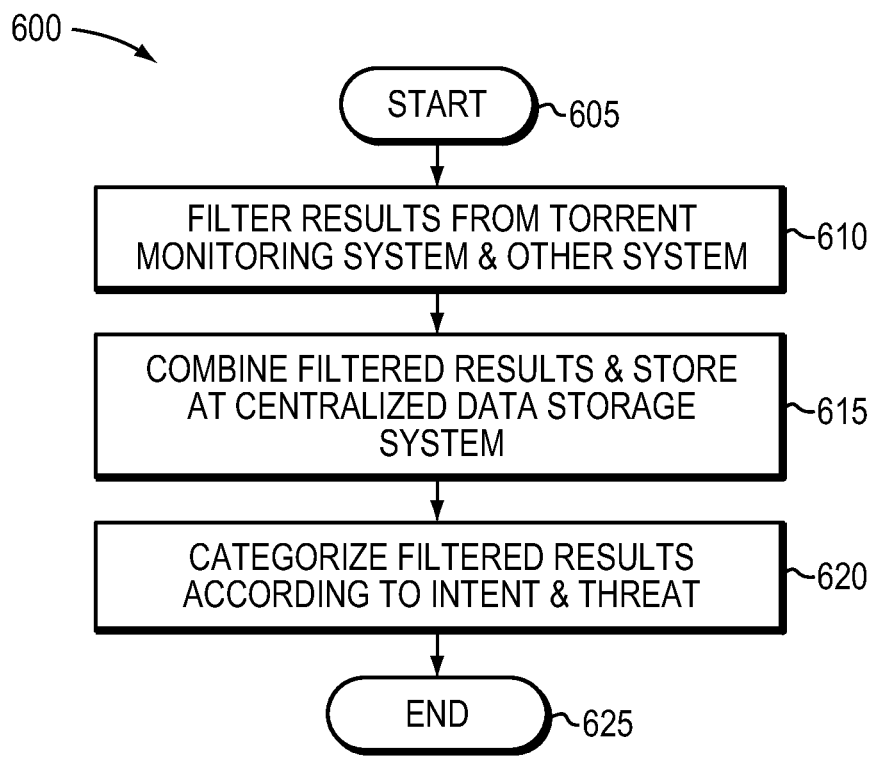
FIG. 6 illustrates an example simplified procedure for cross-comparing information obtained from the novel torrent monitoring system with information obtained from other systems using the same search terms.

FIG. 6 illustrates an example simplified procedure for cross-comparing information obtained from the novel torrent monitoring system 200 with information obtained from other systems using the same search terms. The procedure 600 starts at step 605 and continues to step 610, where the results from a P2P network scan system 505 and the results from the scan from the torrent monitoring system 200 are respectively filtered by filters 515 and 520, for example, wherein the scans utilizes the same search terms. In step 615, the filtered results from the two systems are combined and stored at a centralized data storage system. In step 620, the combined results are categorized according to intent and threat. In step 625 the procedure ends.

It should be understood that the example embodiments described above may be implemented in many different ways. In some instances, the various "data processors" and "computers" described herein may each be implemented by a physical or virtual general purpose computer having a central processor, memory, disk or other mass storage, communication interface(s), input/output (I/O) device(s), and other peripherals. The general purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

The computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A system for monitoring a network, the system comprising:
   one or more network interfaces connected to communicate data over the network;
   a processor coupled to the network interfaces and adapted to execute one or more processes; and
   a memory configured to store a process executable by the processor, the process when executed operable to:
   scan a BitTorrent management page for indicia of a torrent file associated with one or more search terms, wherein the BiTorrent management page is a type of BitTorrent management page of a plurality of types of BitTorrent management pages,
   utilize the indicia to locate a torrent file,
   initiate download of one or more portions of content associated with the torrent file from one or more swarm computers over the network,
   obtain identification information associated with the one or more swarm computers during establishment of a connection with the one or more swarm computers to download the one or more portions of the content,
   store selected torrent information associated with the torrent file and the identification information associated with the one or more swarm computers on one or more storage devices after obtaining the identification information associated with the one or more swarm computers,
   receive, from a client device, a search request including one or more search request terms,
   compare the one or more search request terms with indicia identifying one or more particular torrent files,
   determine that the one or more search request terms match selected indicia of a matching torrent file, and
   in response to the match, transmit at least matching identification information of at least one of a leecher requesting to download the matching torrent file and a seeder sharing the matching torrent file.

2. The system of claim 1 wherein the type of the BitTorrent management page is an index site.

3. The system of claim 1 wherein the type of the BitTorrent management page is a Rich Site Summary (RSS).

4. The system of claim 1 wherein the BitTorrent management page is associated with a Peer-to-Peer network.

5. The system of claim 1 wherein the indicia is a key associated with the torrent file.

6. The system of claim 5 wherein the process when executed is further operable to:
   utilize the key to download the torrent file from a decentralized network.

7. The system of claim 6 wherein the decentralized network is a Distributed Hash Table network.

8. The system of claim 6 wherein the decentralized network is a Peer Exchange network.

9. The system of claim 1 wherein the process when executed is further operable to:
   in response to finding a match, transmit matching torrent information associated with the matching torrent file.

10. The system of claim 1 wherein the process when executed is further operable to:
    cross-compare the selected data associated with the torrent file and the identification information associated with the one or more swarm computers with other information and other identification information obtained from scanning a Peer-to-Peer network utilizing the one or more search terms.

11. The system of claim 1 wherein the one or more swarm computers includes at least one of a leecher and a seeder.

12. A system comprising:
a database configured to store information associated with each of one or more torrent files, wherein the information includes (1) indicia identifying one or more torrent files and (2) swarm identification information identifying at least one of a leecher requesting to download the torrent file and a seeder sharing the torrent file; and
a processor configured to:
receive one or more search terms for a particular torrent file from a client over a computer network,
compare the one or more search terms with the indicia associated with the one or more torrent files stored in the database and the identification information,
in response to a match, return, over the computer network, matching identification information associated with one or more torrent files and matching swarm identification information associated with one or more swarm computers, wherein the matching swarm identification information associated with the one or more swarm computer is obtained during establishment of a connection with the one or more swarm computers to download content associated with the one or more torrent files, and
populate the database with additional indicia associated with additional torrent files utilizing a scan of at least one BitTorrent management page having a syntax and a format, wherein the at least one BitTorrent management page is a type of BitTorrent management page of a plurality of types of BitTorrent management pages.

13. The system of claim 12 wherein the type of BitTorrent management page is an index site.

14. The system of claim 12 wherein the type of BitTorrent management page is a Rich Site Summary (RSS).

15. The system of claim 12 wherein the at least one BitTorrent management page is associated with a Peer-to-Peer network.

16. The system of claim 12 wherein the additional torrent file is associated with a key hosted by the at least one BitTorrent management page.

17. The system of claim 16 wherein the processor is further configured to:
utilize the key to download a torrent file from a decentralized network.

18. The system of claim 17 wherein the decentralized network is a Distributed Hash Table network.

19. The system of claim 17 wherein the decentralized network is a Peer Exchange network.

* * * * *